June 5, 1934. C. L. HANEL 1,961,857
ELECTRICAL CIRCUIT CONTROLLING OR RELAY DEVICE
Filed Jan. 2, 1931 2 Sheets-Sheet 1

Inventor:
Charles Ludwig Hanel.
By Owen W. Kennedy
Attorney

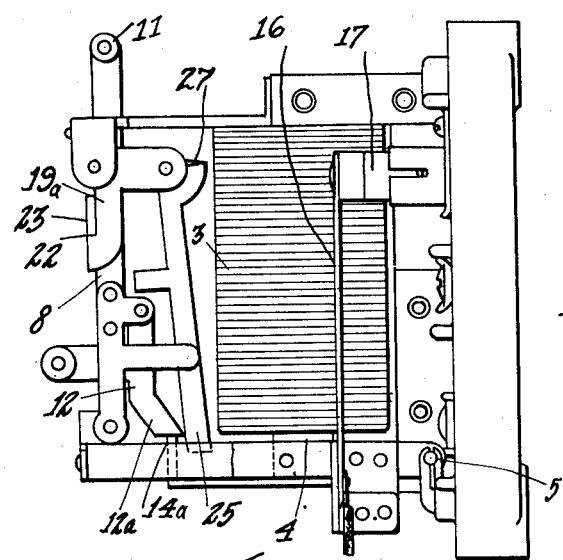
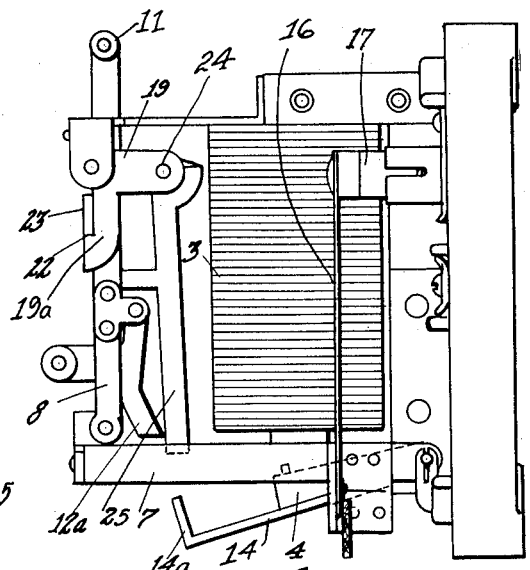
Fig.5.  Fig.6.
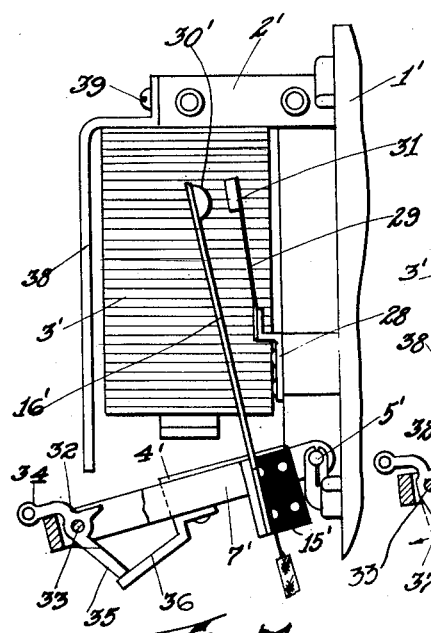
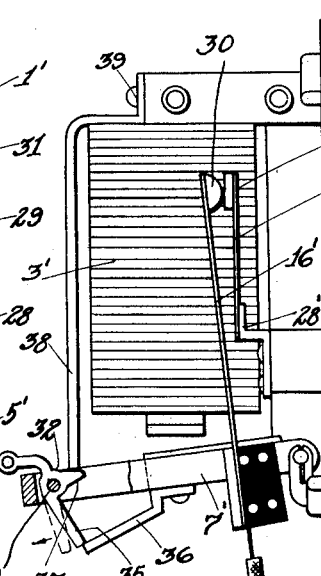
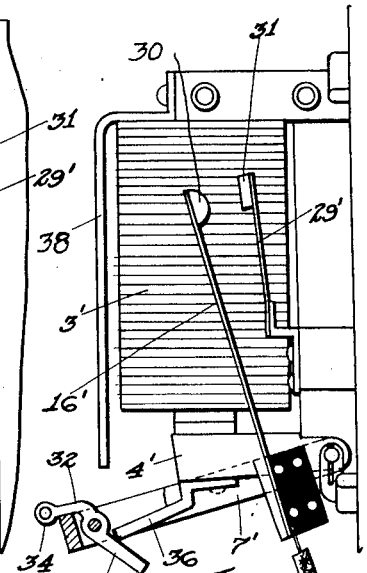
Fig.7.  Fig.8.  Fig.9.
Inventor:
Charles Ludwig Hanel.
By Owen W. Kennedy
Attorney Patented June 5, 1934

1,961,857

UNITED STATES PATENT OFFICE 1,961,857

ELECTRICAL CIRCUIT CONTROLLING OR RELAY DEVICE

Charles Ludwig Hanel, Jackson Heights, N. Y., assignor to Signal Engineering & Manufacturing Company, New York, N. Y., a corporation of Massachusetts Application January 2, 1931, Serial No. 506,257

4 Claims. (Cl. 200—87)

The present invention relates to electrical circuit controlling devices of the general type known as relays in which the energization of an electromagnet, or coil, is utilized to open or close a circuit by the movement of an armature responsive to the electromagnet. In relay devices of this character, as previously constructed, the movable circuit controlling elements have been connected directly to the armatures so that any movement of an armature in response to the energization, or deenergization, of its coil immediately effects a change in the controlled circuit. Therefore, the period during which a circuit controlling element remains in any position is directly proportional to the period of energization or deenergization of the coil.

The object of the present invention is to provide an improved circuit controlling, or relay device, characterized by the provision of a circuit controlling element that is mounted for movement independently of the armature, although responsive to the same, so that the circuit controlling element may maintain the controlled circuit in an open or closed condition for a period greater, or less, than the period of energization, or deenergization, of the coil. By reason of the above described characteristics, the device of the present invention is particularly adapted for use under conditions where it is desired to utilize current impulses to maintain a circuit relation for a period of time greater or less than the periods of successive current impulses. Operating conditions of this sort are encountered in telephony, electrical signalling and in the remote control of electrical apparatus of various kinds. The above and other advantageous features of the invention will hereinafter more fully appear with reference to the accompanying drawings in which:—

Fig. 5 is a view in side elevation similar to Fig. 2 showing the position occupied by the parts when the coil is first energized.

Fig. 6 is a view in side elevation similar to Fig. 2 showing the position occupied by the parts upon deenergization of the coil.

Figs. 7, 8 and 9 are views in side elevation similar to Figs. 2, 5 and 6, respectively, illustrating a modification of the device.

Like reference characters refer to like parts in the different figures.

Figures 1, 2:
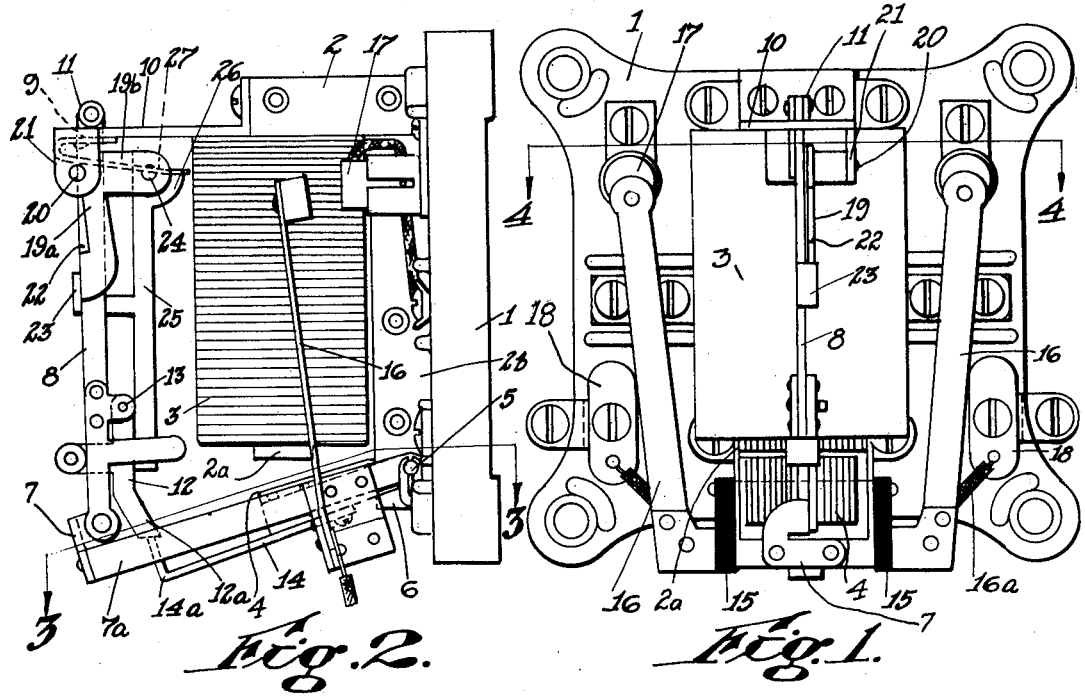
Fig. 1 is a view in front elevation of a circuit controlling device embodying the invention.
Fig. 2 is a view in side elevation of the device shown in Fig. 1 with the parts in an inoperative condition.

Referring first to Figs. 1 and 2, the device comprises an insulating base 1 upon which is mounted a U-shaped magnetic core 2 having legs 2a and 2b of different length. A winding or coil 3 surrounds the shorter leg 2a of the core and an armature 4 is pivotally mounted on a pin 5 passing through the lower end of the longer leg 2b. With the winding 3 deenergized, as in Fig. 2, the armature 4 occupies a downwardly inclined position against a suitable stop 6, with its free end extending below the lower end of the core leg 2a on which the winding 3 is mounted. Obviously energization of the winding 3 will cause the free end of the armature 4 to be drawn upwardly by the core leg 2a, so that it will occupy a substantially horizontal position, as shown in Fig. 5, the armature 4 returning to the position shown in Fig. 2 upon deenergization of the winding 3.

Figures 3, 4:
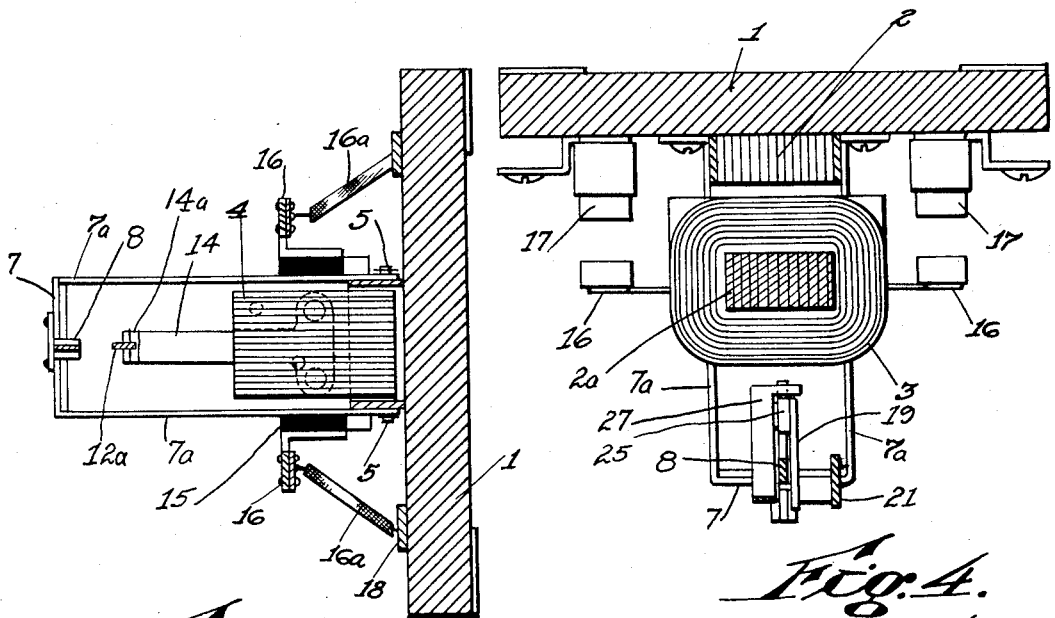
Fig. 3 is a horizontal sectional view along the line 3—3 of Fig. 2, looking in the direction of the arrows.
Fig. 4 is a horizontal sectional view along the line 4—4 of Fig. 1, looking in the direction of the arrows.

As best shown in Figs. 2 and 3, a U-shaped frame 7 is freely supported on the pivot pin 5 of the armature 4, the frame extending forwardly beyond the winding 3 and being pivotally connected at its free end to a vertically movable plunger 8. The upper end of the plunger 8 passes through a slot 9 in a guide plate 10 carried by the core 2, so that the plunger 8 is constrained to move vertically, in a substantially straight line. The upper end of the plunger 8 provides an enlarged head 11 which limits the downward movement of the plunger 8 through slot 9, so that with the winding 3 deenergized, as shown in Fig. 2, the spaced arms 7a of the plunger frame are inclined downwardly substantially parallel to the armature 4.

The plunger 8 carries above its point of attachment to the frame 7 an operating lever 12 pivotally mounted on a pin 13, with an inclined foot portion 12a extending in the direction of the armature 4. With the winding 3 deenergized, the foot portion 12a of the lever 12 terminates just short of the bent up portion 14a of an extension 14 carried by the armature 4. Therefore, with the parts occupying the position shown in Fig. 2, it is obvious that energization of the winding 3, with its resulting attraction of the arm 4 will cause the portion 14a of the armature extension 14 to engage the foot portion 12a of the lever 12, so that turning of the armature 4 imparts upward movement to the plunger 8 and turning of the frame 7 about the pivot 5.

As clearly shown in Fig. 1, each arm 7a of the frame 7 carries an insulating block 15 on which is mounted a resilient contact arm 16, and it is evident from Fig. 2 that turning movement of the frame 7 by the plunger 8 will cause the free end of each contact arm 16 to engage a stationary contact 17 mounted on the insulating base 1. Since the contact arms 16 are connected together by flexible conductors 16a to terminals 18 on the base 1, obviously engagement of the stationary contacts 17 by the arms 16 will establish one or more circuits between the contacts 17 and the terminals 18, the arms 16 being shown in this position in Fig. 5.

With the arrangement of parts described thus far, it is obvious that energization of the winding 3 will move both the armature 4 and the frame 7 upwardly about the pivot 5, thereby bridging the stationary contacts 17. However, upon deenergization of the coil 3, the armature 4 will drop back, and in the absence of the action of any other forces, the frame 7 would also tend to drop back with the armature and thereby separate the arms 16 from the contacts 17. The above, of course, would be the normal operation of an ordinary relay device, but as previously pointed out, the device of the present invention provides means whereby the engagement between the movable contacts 16 and the stationary contacts 17 will be maintained entirely irrespective of the deenergization of the winding 3 and dropping of the armature 4.

To this end, the device provides a latch 19 which, as best shown in Fig. 2, is in the form of a bell crank lever pivotally mounted on a stationary pin 20 carried by a lug 21 projecting downwardly from the guide plate 10. One arm 19a of the lever 19 provides a notch 22 and with the parts in an inoperative condition, as shown in Fig. 2, the notch 22 is positioned above a stop 23 provided on the plunger 8. In this position the lower end of the lever arm 19a bears against the stop 23, with the lever arm 19a slightly inclined from the vertical. The other arm 19b of the lever 19 is pivotally connected by a pin 24 to a link 25 which extends downwardly substantially parallel to the plunger 8. The link 25 provides a shoulder 26 which is engaged by the free end of a spring 27 carried by the guide plate 10, as shown in Fig. 4, the pressure of the spring 27 exerting a thrust tending to hold the end of the link 25 in yielding engagement with the lever 12 and also tending to turn the latch lever 19 in a clockwise direction about its pivot 20. Consequently, that portion of the lever arm 19a just below the notch 22 bears with considerable pressure on the stop 23 of the plunger 8.

As previously pointed out, the parts occupy the position shown in Fig. 2 when the winding 3 is deenergized, so that energization of the winding 3 causes the armature 4 to lift the plunger 8 through the engagement of the armature extension 14 with the operating portion 12a of the lever 12. As the plunger 8 is moved upwardly, the stop 23 is raised with respect to the notch 22 on the latch lever 19 until the lower edge of the stop registers with the notch 22, whereupon the spring 27 immediately turns the lever 19 in a clockwise direction to swing the notch 22 below the stop 23, thereby locking the plunger 8 against downward movement, as shown in Fig. 5. It will also be apparent from Fig. 5, that the locking of the plunger 8 occurs just as the armature 4 reaches the upper limit of its travel in response to energization of the winding 3, at which time also upward turning movement of the frame 7 about the armature pivot 5 has caused the contact arms 16 to simultaneously engage the stationary contacts 17. Therefore, if at this particular moment, or shortly thereafter, the winding 3 be deenergized, then it is obvious that when the armature 4 drops to the position shown in Fig. 6, the plunger 8 and frame 7 will remain locked in their raised position, so that the circuit through the contacts 17 is maintained in spite of the deenergization of winding 3.

The positions occupied by the parts of the device following successive energization and deenergization of the winding 3 is shown in Fig. 6 from which it is evident that the armature extension 14 is then below the horizontal frame 7. It will also be noted in Fig. 6 that the bent portion 14a of the armature extension 14 is directly in line with the lower end of the link 25, whereas the operating portion 12a of the lever 12 on the plunger 8 is disposed between the plunger and the lower portion of the link 25, and the link 25 is moved to this position only upon the dropping back of the armature 4 following the locking of the plunger 8 in its upper position. As will be evident from a consideration of Fig. 5, when the plunger 8 is moved upwardly, the link 25 is swung to the right against the pressure of the spring 27 by the camming action of the inclined face of the operating portion 12a of the lever 12, the link 25 reaching its extreme position just as the latch lever 19 locks the plunger 8 in its upper position. Therefore, when the armature 4 drops away following deenergization of the winding 3, the pressure of the spring 27 tends to return the link 25 to its initial position parallel with the plunger 8. Since the end of the operating portion 12a of the lever 12 is in engagement with the link 25 in its deflected position, obviously the return of the link 25 toward the plunger 8 will shift the lever portion 12a to the left, such movement being permitted by the free pivotal mounting of the lever 12. Consequently, deenergization of the winding 3 serves to position the lower end of the link 25 directly above the armature extension 14 as shown in Fig. 6 for a purpose which will now appear.

When the winding 3 is energized a second time with the parts occupying the position of Fig. 6, upward movement of the armature extension 14 will cause the bent-over portion 14a to directly engage the lower end of the link 25, thereby thrusting the link 25 upwardly and imparting a turning movement, in a counterclockwise direction, as viewed in Fig. 6, to the latch lever 19. This turning of the lever 19 quickly withdraws the notch 22 of the lever arm 19a from beneath the stop 23, as indicated in dotted lines in Fig. 6, so that the plunger 8 and its frame 7 quickly drop to the position shown in Fig. 2 wherein the contact arms 16 are separated from the stationary contacts 17. Therefore, the second energization of the winding 3 has the immediate effect of unlocking the frame 7 and of breaking the circuit between the stationary contacts 17.

From the foregoing, it is apparent that the device of the present invention is adapted to effect a change in the controlled circuit only upon every alternate energization of its winding, since two separate current impulses are necessary to perform the operations of locking and unlocking the device. Thus momentary current impulses can be employed to obtain the closure of a circuit an appreciable period, whereas in the ordinary relay device the period of energization, or deenergization, of the coil directly determines the period of circuit closure. As previously pointed out, the invention also contemplates functioning of the circuit controlling element to make or break a circuit within a period less than the period of the controlling current impulse, and this modified form of the device will now be described with reference to Figs. 7, 8 and 9.

The relay device shown in Fig. 7 is in many respects similar to the device shown in Fig. 2, the base 1' supporting a U-shaped magnetic core 2' with one leg surrounded by the winding 3'. The armature 4' is mounted on a pivot 5' and a frame 7' is adapted to turn freely on the pivot 5' in the same manner that frame 7 is adapted to turn on the pivot 5 of the armature 4. The frame 7' also carries insulating blocks 15' for supporting resilient contact arms 16' adapted for swinging movement with the frame 7'. The base 1' provides stationary contact lugs 28 each of which carries a resilient contact arm 29 which is normally flexed in the direction of the movable contact arm 16', as shown in Fig. 7. With the winding 3 deenergized and the frame 7' occupying the position of Fig. 7, the ends of the contact arms 16' and 29 are spaced apart a relatively short distance and when the frame 7' is moved upwardly about its pivot by the armature 4', as will be hereinafter described, a rounded contact 30 at the end of the arm 16' will engage a flat contact 31 at the end of the arm 29 with a sliding action and the arm 29 will be flexed rearwardly from its normal position, as shown in Fig. 8. In other words, engagement of the contacts 30 and 31 will place the arm 29 under tension, so that it tends to resist closure of the contacts 30 and 31.

The pivoted frame 7' carries at its outer end a latch 32 pivotally mounted on a pin 33, with a weighted portion 34 overhanging the edge of the frame 7' so as to maintain a tail portion 35 of the latch 32 in the position shown in Fig. 7. With the armature 4' occupying its lower position, with the coil 3 deenergized, an extension 36 secured to the lower face of the armature 4' projects below the tail portion 35. Consequently when the armature 4' is drawn upwardly upon energization of the coil 3 engagement of the extension 36 with the tail portion 35 of the latch 32 causes the frame 7' to move upwardly with the armature 4' into the position shown in Fig. 8. This movement of the frame 7' causes the contact 30 to engage the resiliently supported contact 31, thereby placing the arm 29 under tension, as previously pointed out.

As the armature 4' approaches the upper limit of its movement into engagement with the core 2', carrying with it the frame 7', a lug 37 turnable with the latch 32 engages the lower end of a stop 38 extending downwardly in front of the coil 3', the upper end of the stop 38 being attached to the core 2' at 39. This engagement of the lug 37 with the stop 38 occurs while the armature 4' is still moving to its upper limiting position, and after the contacts 30 and 31 have been in engagement an appreciable period, the coil 3 being still energized.

When the stop 38 engages the lug 37, as indicated in Fig. 8, continued upward movement of the armature 4' causes the stop 38 to turn the latch 32 in a counterclockwise direction, as indicated in dotted lines in Fig. 8, thereby disengaging the tail portion 35 of the latch 32 from the armature extension 36. This has the effect of breaking the operative connection between the armature 4' and the frame 7', thereby permitting the frame 7' to drop back quickly into the position shown in Fig. 9 with the contacts 30 and 31 separated. Disengagement of the contacts 30 and 31 is effected very rapidly owing to the fact that the contact arm 29 was under tension at the time the latch 32 was released from the armature extension 36. Consequently the energy stored up in the flexed arm 29 serves to exert a force tending to move the frame 7' downwardly immediately upon its release from the armature 4'.

From the above described operation of the parts shown in Figs. 7, 8 and 9 it is obvious that the contacts 30 and 31 will be engaged and disengaged within a period less than the period of energization of the coil 3', separation of the contacts 30 and 31 occurring before the armature 4' has reached the end of its movement into engagement with the core 2'. Thus a rapid making and breaking of the controlled circuit is insured, even though the current impulse energizing the coil 3 is of relatively long duration. For example, the energization of the winding 3' might be under the control of a switch which could remain closed during an appreciable period without in any way affecting the period during which contact is maintained between the arms 16' and 29. Obviously by regulating the distance between the contacts 30 and 31 with relation to the distance through which the armature 4' travels, the contacts 30 and 31 could be made to engage each other and separate almost instantaneously.

From the foregoing then, it is apparent that by the present invention there is provided an improved electrical circuit controlling or relay device characterized by the provision of a movable circuit controlling element that is adapted to maintain the controlled circuit in an open or closed condition for a period greater, or less, than the period of energization, or deenergization, of the controlling coil.

I claim,

1. In an electrical circuit controlling or relay device, a winding, a pivotally mounted armature turnable in one direction in response to energization of said winding, a circuit controlling element mounted on the same pivot as said armature and movable independently thereof and a latch carried by said controlling element adapted to be engaged and released by said armature in its movement in response to energization of said winding, movement of the said armature in the opposite direction, upon deenergization of said winding, always taking place independently of said controlling element.

2. In an electrical circuit controlling or relay device, a winding, a pivotally mounted armature turnable in one direction in response to energization of said winding, a circuit controlling element carried by a frame mounted on the same pivot as said armature and turnable in either direction independently of said armature and a latch carried by said frame adapted to be engaged and released by said armature in its movement in response to energization of said winding, movement of said armature in the opposite direction upon deenergization of said winding always taking place independently of said frame.

3. In an electrical circuit controlling or relay device, a winding, a pivotally mounted armature normally maintained by gravity in a position separated from the core of said winding, a circuit controlling member mounted on the same pivot as said armature and turnable independently thereof, a latch carried by said circuit controlling member adapted to be engaged by said armature at the start of its upward movement in response to energization of said winding, and a stationary stop adapted to engage said latch and release said member from said armature before the latter has reached the end of its movement toward the core of said winding, said member dropping back to its original position upon release from said armature.

4. In an electrical circuit controlling or relay device, a winding, a pivotally mounted armature turnable in one direction in response to energization of said winding, a stationary contact member, a contact arm carried by a frame mounted on the same pivot as said armature and movable independently thereof, and a latch carried by said frame adapted to be engaged and released by said armature in its movement in response to energization of said winding, movement of said frame with said armature causing said contact arm to engage said stationary contact member and movement of said armature in the opposite direction upon deenergization of said winding taking place independently of said frame and of the engaged contacts.

CHARLES LUDWIG HANEL.